UNITED STATES PATENT OFFICE.

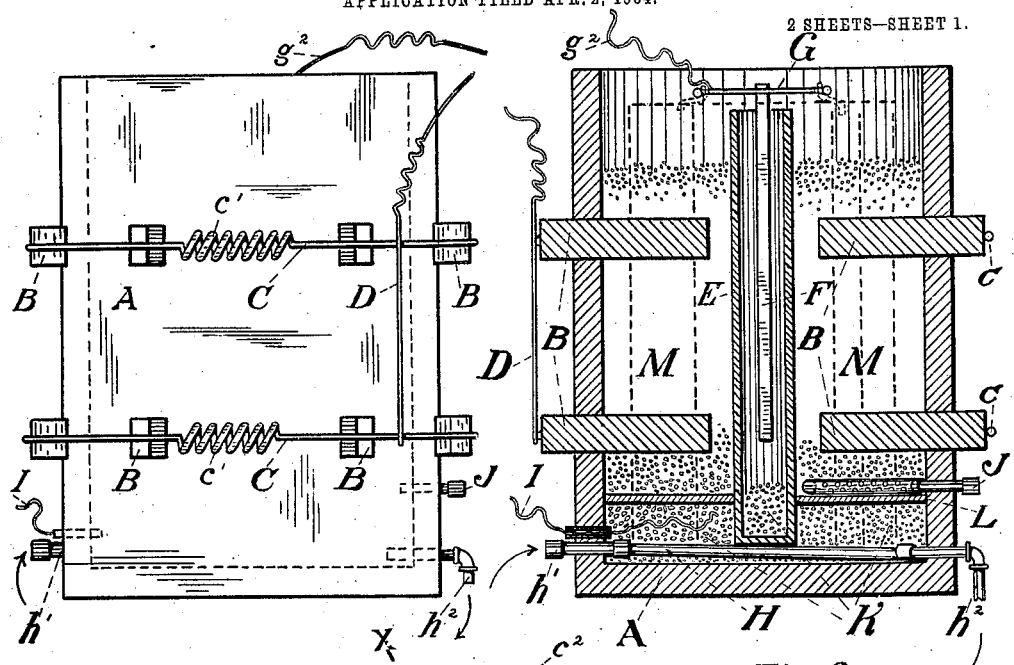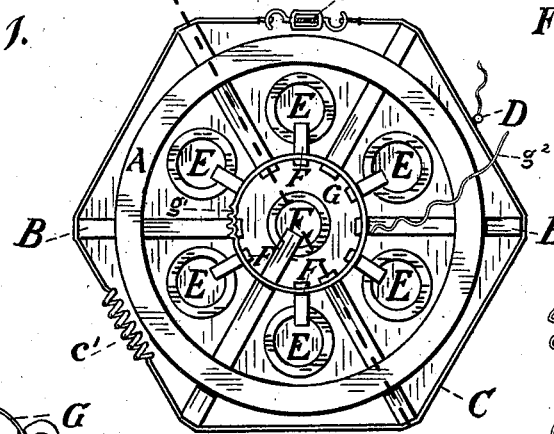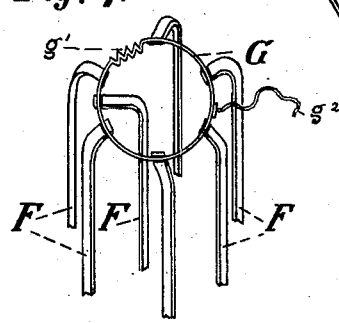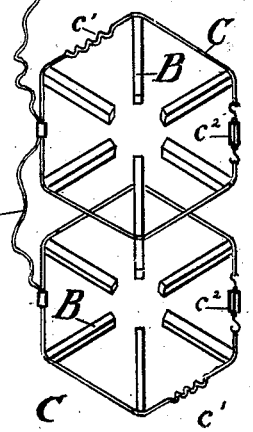

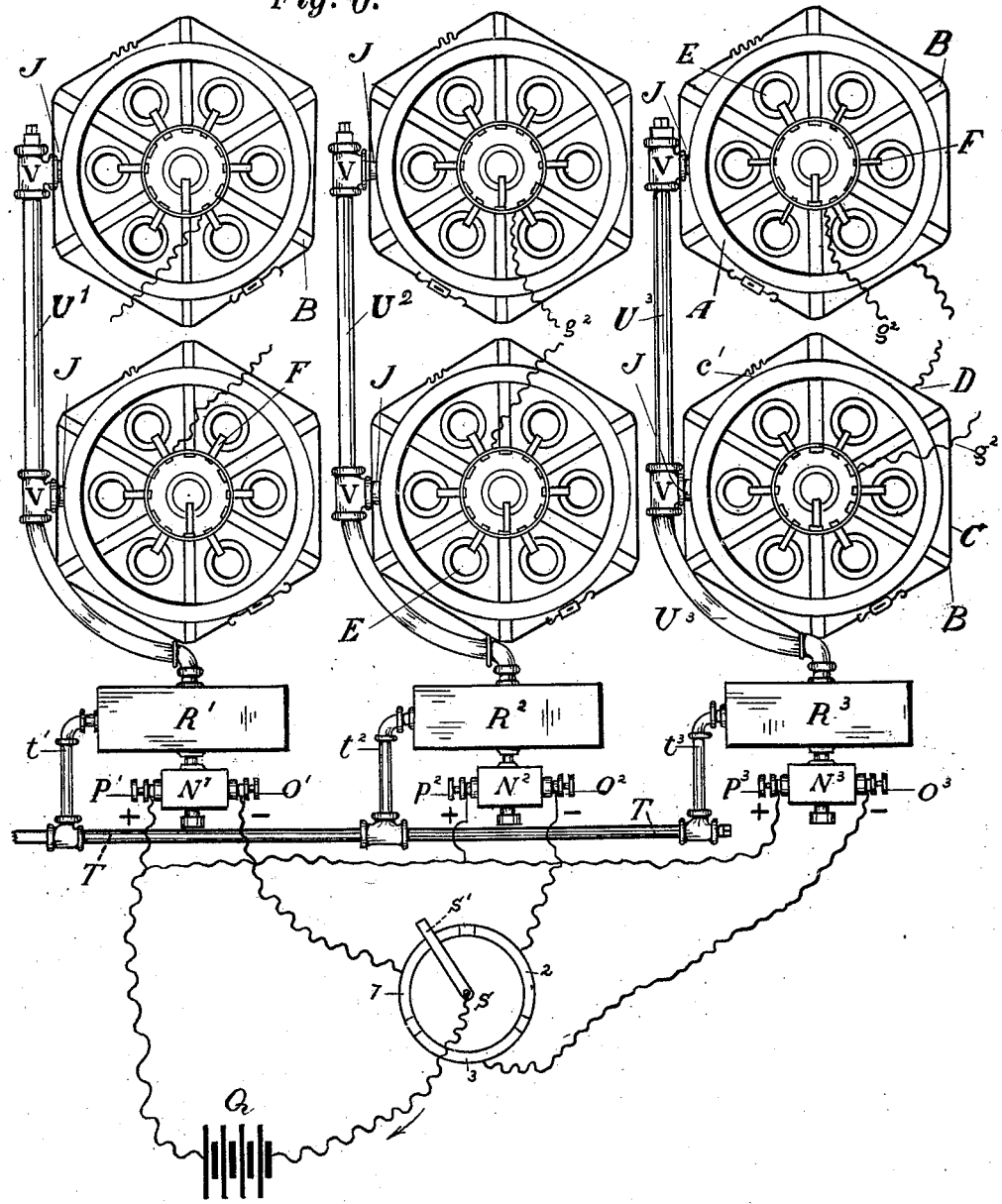

BAROUKH JONAS, OF TOLEDO, OHIO.

GALVANIC CELL.

No. 828,319.     Specification of Letters Patent.     Patented Aug. 14, 1906.

Application filed April 2, 1904. Serial No. 201,356.

*To all whom it may concern:*

Be it known that I, BAROUKH JONAS, a citizen of Turkey, residing at Toledo, in the county of Lucas and State of Ohio, have invented certain new and useful Improvements in Galvanic Cells; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in galvanic cells, and more strictly in such a peculiar class as may be properly termed "galvanic" cells, which consists of periodically filling and emptying the cells with electrolytic fluid, which periodically drives out and fills the cell with air, which very greatly assists the cell in its generating power.

The objects of my invention are to reduce the cost of generating electricity, to produce a plant of any desired capacity that can be kept in active running condition at a very nominal cost of labor or material, and to maintain the same bank of cells in active generating condition for many months, the cells at the same time possessing within themselves a continually-renewing force. I attain these objects by the mechanism illustrated in the accompanying drawings, in which—

Figure 1 is a side elevation of one of the tanks or cells complete. Fig. 2 is a top view of one of the cells complete with the cover removed. Fig. 3 is a vertical center section of the cell complete, taken on the line X X, Fig. 2. Fig. 4 is a perspective skeleton view of the internal conducting system. Fig. 5 is a perspective skeleton view of the external conducting system. Fig. 6 is a top view of a series of cells complete arranged in couplets or groups together and in a general group in one plane with an electrical pumping system attached.

In all of the views like characters refer to like parts.

In entering into a detailed description of my invention part by part I will refer first to Sheet 1 of the drawings, in which first is shown in Fig. 1 an elevation view of a tank or cell complete. This exterior tank A of the cell is made in this case preferably of concrete, although I do have them of wood and earthenware, round in form and having all of the pipes, tubes, and carbon plates or beams built or cemented in solid in the concrete. In this tank are arranged a series of horizontal carbon plates B B in two sections, an upper and lower section, each arranged systematically, extending horizontally up from a few inches outside of the tank radially to about two-thirds the distance from the inside of the tank to its center point. In this case there are six plates on each section; but if the tank were large there would be more in each upper and lower section; the object being to divide the internal space of the tank evenly with these conducting carbon plates. I do not desire to be limited at all in the manner of placing the carbon plates through the tank and through the body of granulated carbon, but prefer to reserve the right to place the carbon plates in the cells vertical from above or below, horizontal in planes radial, or on incline either toward or from the center, as I find that all of these variations produce the same result generally. Around the outside of the tank A and over the ends of each of these carbon plates B a metal wire C is tightly drawn, making a perfect contact with the end of each carbon plate B, the same being kept tight and in perfect contact by the pressure of the coiled-spring section $c'$ and the turnbuckle $c^2$, each upper and lower section being so arranged separately, and then the two are both held in contact with the conducting-wire D. In the tank is arranged at its bottom a heat-circulating coil H, having an inlet $h'$ and a drain or outlet $h^2$. This coil is designed to keep the internal contents of the cell at a desired degree of heat to increase its generating power. Around this coil and covering it is filled in a quantity of small particles of iron K K as a positive electrode. On this bed of iron particles is systematically arranged a series of porous jars E E, one in the middle and one between the carbon plates in each of the spaces, as shown in Fig. 2. These porous jars extend up to near the top of the tank. Around these jars at the bottom the filling of iron particles is continued up to about six inches depth, and in this body of iron filling is placed a conducting-wire I, that extends through its tube outside. The interior of the porous jars is also filled at the bottom with iron particles to a depth of about one-half. The filling of the iron particles in the porous jars does not extend half-way up the jars, because it confuses and crowds the view of other parts. The solution covering the strip and the iron particles both complete the action. Also the solution remains at all times on the particles of iron. The feed and draining pipe J, with its internal perforated door, is shown in Fig. 3 above the canvas wall L over the iron filling K K, and the heat-circulating coil H being shown also in the body of iron at the bottom of the cell. On this iron filling between the porous jars is placed a flexible insulated canvas wall L to prevent short-circuit in the cell, and on this canvas wall L lies a perforated flexible drain-coil J, to which the electrical pumping system is attached, as shown in Fig. 6. All of the space between the porous jars E E and the two series of carbon plates B B is filled in with granulated carbon M M from the canvas wall L to near the top of the porous jars E E as a negative electrode. In each of the porous jars is suspended a ribbon, of silver, F, the whole system of which ribbons are secured in contact with a wire ring G, to which a conducting-wire $g^2$ is attached, as is shown in Fig. 4, which is a skeleton view of the internal conducting system forming the negative terminal, and, on the other hand, Fig. 5 shows in the same way the skeleton system of the external conducting system, forming the positive terminal, which consists of the two systems of carbon plates B B, the metal binding-wires C C, and contact conducting-wire D.

The interior filling of the cell being now complete, it is flooded with an electrolytic fluid solution until it rises above the top of the porous jars, filling them all to a point of level at the broken line above the jars, which solution is chlorid of iron, or any other iron salts, dissolved in water, as an electrolyte, ($FeCl^2$;) but in order to produce the best result in the generating of electricity in this manner it is necessary to arrange these cells, as many as may be desired, in couplets and groups on a horizontal plane and connect them by pipes with a centrifugal pump and an electrical motor to each couplet, said pipes being provided with insulated sections to avoid short circuit in the system. This part of the construction I have further illustrated on Sheet 2 of the drawings, Fig. 6, showing a group of six cells complete, arranged and connected in three couplets, with a separate centrifugal pump and an electrical motor arranged in connection with a three-way switch which alternately sends the current into the three motors and operates alternately the three centrifugal pumps and empties and fills alternately the three couplets of cells. Each of the six cells shown in this group are set up and packed and wired in the same manner as the one carefully described and shown above. Also each is provided with exterior arrangements as described. The heating and drain system, as shown in Fig. 3, are all connected to a main feed-pipe and a main drain-pipe on their respective sides, as indicated in Fig. 3, and they are fed by a steam circulation, hot-air or a hot-water circulation, raising the heat to near 150° Fahrenheit, if desired. Now, as shown in Fig. 3, the siphon draining-hose J is arranged so as to always lie on the canvas wall L, so that as the granulated iron is consumed the canvas wall sinks down and carries the perforated hose with it, so that in pumping out the electrolytic fluid the pump will always pump or suck out all of the fluid except what is always needed to keep the deposit of iron under the canvas wall L always covered with the electrolytic solution. It is shown that the three pipes $U'$ $U^2$ $U^3$ are connected, respectively, to the three centrifugal pumps $R'$ $R^2$ $R^3$, and they are also connected to the pipes J J on each of the tanks at the T-fittings V V, so that each pump controls the filling of two of the cells and also the emptying of the same two, and each pump $R'$ is operated by its electric motor $N'$, which receives its current or energy from the battery Q and is controlled by section 1 of the three-way switch S, the other two couplets being connected and operated in their parts exactly in the same way and with the same results. Now this pumping system is not a system of discharge and waste of the electrolytic fluid, but it is simply a transferring system from one couplet of cells to another couplet of cells. Also a current from the cell may take the place of battery Q. The three pumps are connected together by pipe T and the branch pipes $t'$ $t^2$ $t^3$ attached to the pumps $R'$ $R^2$ $R^3$, and these pumps have no check-valves in them to prevent the backward flow when the pumps are stopped.

Now to explain the alternate system of filling and draining of the group of cells I will proceed as follows: There is enough of the electrolytic solution to fill four of the cells and the pumps and pipes, and there are two of the cells pumped out—say the third couplet—with its pump $R^3$. The switch-arm $S'$ stops on the switch-section 1, the motor $N'$ starts the pump $R'$, and the solution is pumped out of that couplet of cells and forced through the pipe T into the couplet 3. When it is full and couplet 1 is drained, the switch-arm $S'$ flies around onto the switch-section 2, and pump $R'$ stops and pump $R^2$ starts and pumps the solution out of couplet 2 and forces it into couplet 1. When couplet 2 is empty and 1 is full, the switch-arm $S'$ flies around onto switch-section 3 and pump $R^2$ stops and pump $R^3$ starts and empties couplet 3 and fills couplet 2. Then the switch-arm flies around onto section 1 again, thus continuing the same routine again, and as each cell is emptied the air rushes in and fills all of the little cavities in and around and among the particles of granulated carbon. Then, again, as it fills with the solution the air is all driven out except what is imprisoned in the thousands of little cavities, where the minute iron particles come in contact with the air and the electrolytic solution where electricity is liberated and attracted to the carbon plates and the conducting-wires. Then, also, all of the positive conducting-wires are connected together and form the positive terminal, and all of the negative wires are connected together and form the negative terminal. The centrifugal pump and the electric motor and the electric switch in their construction do not form a part of this application. In this construction of a galvanic cell the amount of current or energy produced may be increased as desired by increasing the number of cells.

There are several points about the relative location of parts. The proportions of substances may be varied and not change the features or the meaning and strength of my claims, such as the points of connection or contact for conducting-wires, the relative proportion of a filling of granulated iron and granulated carbon, the relative proportion of carbon plates to the bulk of granulated carbon, and the size of the carbon plates and their exact location up or down in the tank. I have carefully described the parts of my galvanic cell piece by piece and shown their relation to each other and also the manner of grouping them for a large generating-plant system, together with the plan of heating and the manner of filling and emptying the cells of the electrolytic solution in order to produce the inhaling and exhaling of the air to produce the desired result described and obtained by the system, and, viewing the state of the art, I am aware that there are galvanic cells of various kinds, but not of this construction and embodying the special feature in this one. I therefore do not claim the matter of a galvanic cell broadly; but What I do claim as my invention, and desire to secure by Letters Patent, is—

1. In a galvanic cell the combination of an outer tank constructed of concrete, wood or any suitable material, having two series of carbon plates cemented in its walls and provided on its outside on the ends of said carbon plates with metal binding conducting-wires, made tight by a coiled-spring section and a turnbuckle, and internally provided at the bottom with a heating-pipe with outlets through the tank on which is placed a series of porous jars and around which is packed a partial filling of granulated iron and also a partial filling of iron in the porous jars; on the top of the iron closely spread a insulating-wall of canvas, on which lies a perforated siphon-hose with its outlet through the tank and from the canvas wall to the tops of the porous jars the tank being closely packed in with granulated carbon and in the porous jars suspended silver strips connected by a metal binding-wire and a conducting-wire thus forming a cell with an outer and inner positive and negative terminal respectively, substantially as shown, and specified.

2. In a galvanic cell the combination of a tank with two series of horizontal radial carbon plates inserted in it, the outer ends of which are in touch with a metal contact-wire and connected by a conducting-wire as a positive terminal, with an internal filling, at the bottom a heating-pipe, a section filled with granulated iron, a series of porous jars with a partial filling of granulated iron, an insulated canvas wall on the iron and a siphon-hose on the canvas wall, also a filling of granulated carbon from the canvas wall to the top of the porous jars, and silver strips in the porous jars connected together forming the negative terminal, substantially as shown and described.

3. In a galvanic cell, a tank in which are mounted a series of radial carbon plates which extend outside of the tank and connect with conducting-wires and on the inside they extend toward the center and alternate with a series of vertical porous jars packed in below with particles of iron and covered with a wall of non-conducting canvas on which lies a pumping-hose and a filling of granulated carbon to the tops of the porous jars, said porous jars having an internal partial filling of iron particles and a suspended silver ribbon connected by a conducting-wire, the said cells arranged in a group and connected by pipes in couplets to a pump, a motor and switch therefor for operating said pump so as to alternately fill and empty the cells with air and electrolytic solution, substantially as shown and specified.

4. In a galvanic cell, a group of six cells arranged in couplets with a pipe, pump, motor and switch connection which is all external to the cells, the interior of each cell being provided with the series of radial carbon plates between which are the vertical porous jars, the partial filling of iron particles in the jars and in the bottom of the tank on the heating-pipe, the canvas wall and pumping-hose on said iron filling, and the upper filling of granulated carbon, the carbon plates connected by wires outside form a positive terminal and the conducting-wires from the iron particles form a negative terminal, and the electrolytic solution also covering the granulated carbon as shown and described.

In testimony whereof I affix my signature in presence of two witnesses.

BAROUKH JONAS.

Witnesses:
MARIAN BOSSARD,
LILLIAN FOX.